United States Patent [19]

Nagai

[11] Patent Number: 5,016,910
[45] Date of Patent: May 21, 1991

[54] SUSPENSION CYLINDER CONTROL SYSTEM FOR MOTOR VEHICLES

[75] Inventor: Takao Nagai, Kanagawa, Japan

[73] Assignee: Kabushiki Kaisha Komatsu Seisakusho, Tokyo, Japan

[21] Appl. No.: 469,470

[22] PCT Filed: Jul. 27, 1989

[86] PCT No.: PCT/JP89/00769

§ 371 Date: May 29, 1990

§ 102(e) Date: May 29, 1990

[87] PCT Pub. No.: WO90/01427

PCT Pub. Date: Feb. 22, 1990

[30] Foreign Application Priority Data

Jul. 29, 1988 [JP] Japan ............................ 63-099961[U]

[51] Int. Cl.⁵ .................................................. B60G 17/015
[52] U.S. Cl. ...................................... 280/707; 280/689
[58] Field of Search ................ 280/707, 840, 6.12, 280/689, 772; 364/424.05

[56] References Cited

FOREIGN PATENT DOCUMENTS

| | | | |
|---|---|---|---|
| 57-182505 | 11/1982 | Japan . | |
| 59-57009 | 4/1984 | Japan . | |
| 59-106307 | 6/1984 | Japan . | |
| 61-81211 | 4/1986 | Japan . | 280/707 |
| 62-27810 | 2/1987 | Japan . | |
| 62-96112 | 5/1987 | Japan . | |
| 62-299416 | 12/1987 | Japan . | 280/707 |
| 2-38128 | 2/1990 | Japan . | 280/707 |

*Primary Examiner*—Richard A. Bertsch
*Assistant Examiner*—Karin Tyson
*Attorney, Agent, or Firm*—Armstrong, Nikaido, Marmelstein, Kubovcik, & Murray

[57] ABSTRACT

A suspension cylinder control system for motor vehicles for preventing a body roll occurring when a vehicle is rounding a curve at a high speed, a nose dive on braking, and a nose up occurring when a dumping body is raised in an unloading position, and also for acquiring the optimum suspension characteristics in accordance with a vehicle load and speed. The control system comprises suspension cylinders 4 mounted between a vehicle body 1 and right and left front and rear wheels 2, 3; a pressure sensor 6 which detects the inside pressure of these suspension cylinders; a steering angle sensor 7 of a steering wheel 5; a brake sensor 8; a vehicle speed sensor 9; a dump lever position sensor 14; and a controller 10 which receives signals from these sensors and outputs a damping force changeover signal to an air solenoid valve device 11 which controls a damping force changeover actuator 12 of the suspension cylinders in accordance with the input signal.

4 Claims, 2 Drawing Sheets

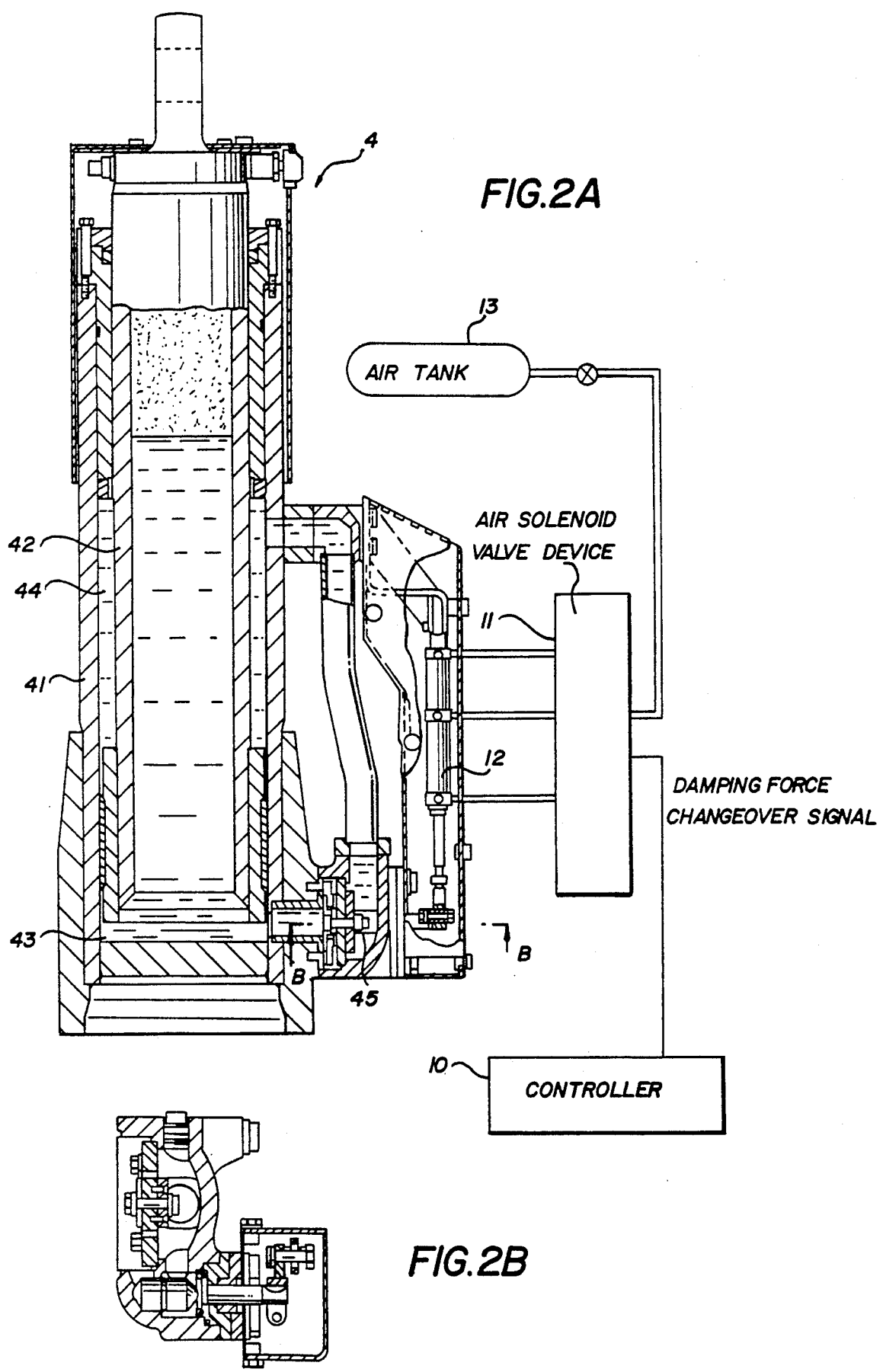

SUSPENSION CYLINDER CONTROL SYSTEM FOR MOTOR VEHICLES

FIELD OF THE INVENTION

The present invention relates to a suspension system for motor vehicles and, more particularly, to a damping force control system of a suspension system mounted between a vehicle body and front and rear right and left wheels of a motor vehicle.

BACKGROUND OF THE INVENTION

There has been known in the prior art such a suspension system that front and rear wheels are mounted on a vehicle body through suspension cylinders in order to prevent the passage, up to the vehicle body, of the bouncing of the front and rear wheels during a drive along a rough road.

The vehicle body provided with this type of suspension system undesirably tends to make an outward tilt, or a body roll, on cornering, with a centrifugal force acting to contract the outer suspension cylinders of the motor vehicle.

In order to prevent the body roll, therefore, there has been adopted a means to detect a steering angle or a steering angular velocity when the steering wheel is manipulated, for the purpose of increasing a damping force of the outer suspension cylinders of the vehicle when the vehicle is rounding a curve, thereby restraining suspensions' contraction caused by the centrifugal force.

However, in the detection of the steering angle alone, the steering wheel must be turned to a set steering angle to obtain a desired damping force of the suspension cylinders. That is, the suspension cylinders can not quickly respond to steering conditions, and therefore a vehicle body roll in the initial period of a turn can not be prevented.

In the detection of the steering angular velocity, when the vehicle is turned on a fixed circle with the steering wheel fixed at a prescribed steering angle, the damping force of the outer suspension cylinders can not be increased and accordingly it is impossible to prevent a body roll.

SUMMARY OF THE INVENTION

The present invention overcomes the drawbacks of the prior art and has for its object to provide a suspension cylinder control system for motor vehicles which is capable of preventing a body roll with a delay of response on turns, particularly on turns at a high speed over a specific vehicle speed, and also preventing a body roll on turns on a fixed circle.

Another object of the present invention is to provide a suspension cylinder control system for motor vehicles which is capable of obtaining the optimum suspension characteristics according to vehicle load and also to improve driving stability by intensifying the damping mode of the suspension cylinders when the vehicle speed has increased over a specific speed.

Another object of the present invention is to provide a suspension cylinder control system for motor vehicles which is capable of preventing a nose dive (a downward plunging of the front end of the vehicle body) by intensifying the damping mode of the suspension cylinders at the time of brake application and, on the other hand, preventing the nose up of the vehicle body by intensifying the damping mode when unloading the load from a dumping body.

The present invention, according to its first embodiment, accomplishes the aforementioned objects by providing a suspension cylinder control system for motor vehicles which comprises suspension cylinders mounted between the vehicle body and the right and left front wheels and between the vehicle body and the right and left rear wheels, a pressure sensor which detects the inside oil pressure of each of these suspension cylinders, a steering angle sensor which detects the steering angle of a steering wheel of the vehicle, and a controller which receives a detection signal from each of these sensors and outputs, from the steering angle sensor, a signal to increase the damping force of the suspension cylinders in accordance with the steering angular velocity until an oil pressure difference of the right and left suspension cylinders of the front and rear wheels decreases below a fixed value.

According to the second embodiment of the present invention, there is provided a suspension cylinder control system for motor vehicles which is the control system described above in the first embodiment and comprises a vehicle speed sensor which detects the traveling speed of the vehicle, a brake sensor which detects the brake operation of the vehicle, and a dump lever position sensor which detects the unloading position of the dumping body, wherein signals from these sensors are inputted to the controller.

Furthermore, according to the third embodiment, the present invention provides a suspension cylinder control system, which is a control system described in either the first or the second embodiment, further comprising an air solenoid valve means for driving a damping force changeover means provided on the suspension cylinder by means of a damping force changeover signal outputted from the controller.

The aforementioned objects and other objects, embodiments and advantages of the present invention will become more apparent to those skilled in the art from the following detailed description of a preferred embodiment consistent with the principle of the present invention, when read in connection with the accompanying drawings.

BRIEF DESCRIPTION OF THE DRAWINGS

FIG. 2A is a longitudinal sectional view of the suspension cylinder used in the embodiment shown in FIG. 1; and FIG. 2B is a sectional view taken along line B—B in FIG. 2A.

DETAILED DESCRIPTION OF A PREFERRED EMBODIMENT

Figure 1:
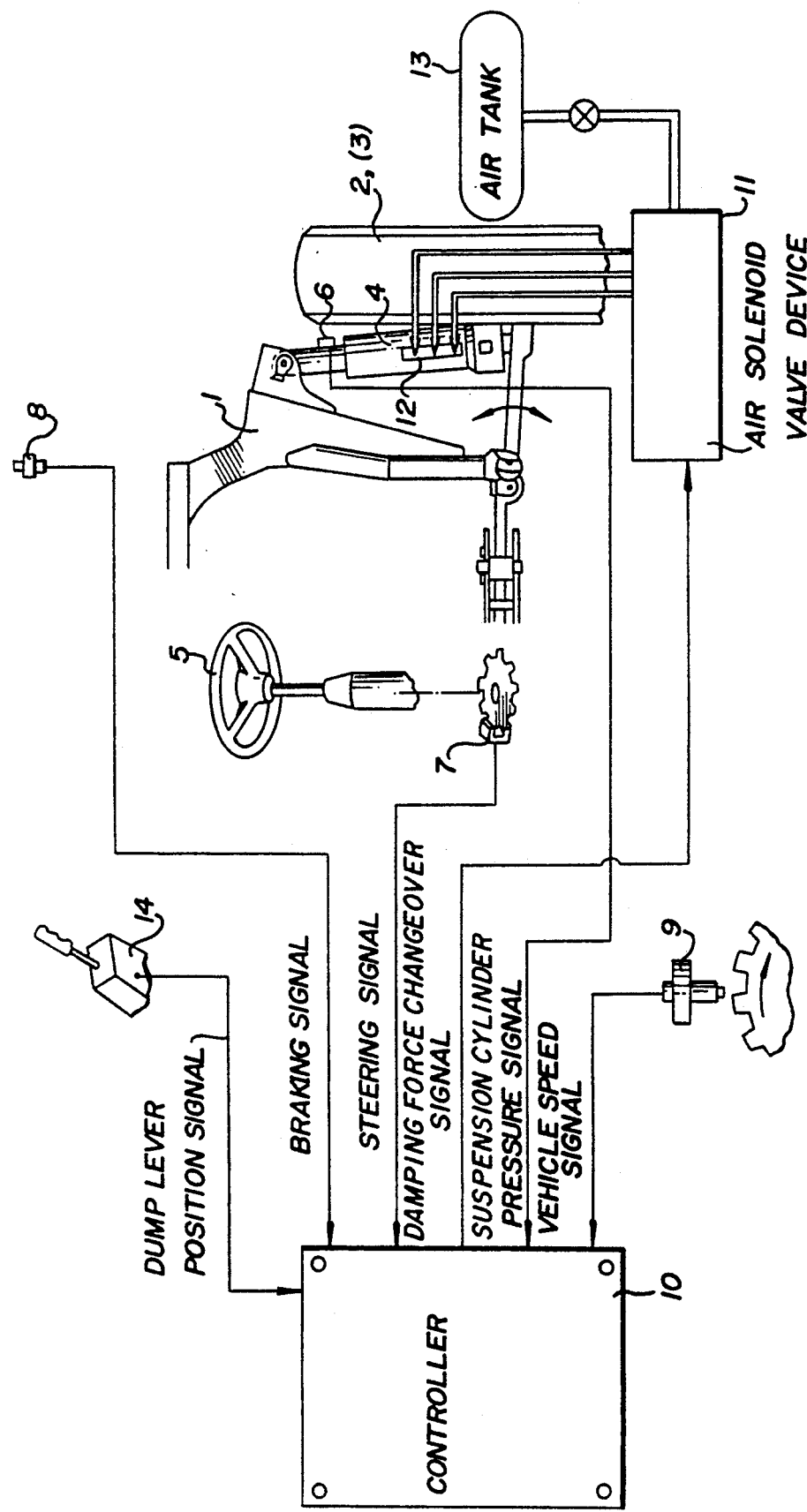
FIG. 1 is an exemplary schematic view of a suspension cylinder control system according to one embodiment of the present invention.

Hereinafter an exemplary embodiment of a suspension cylinder control system according to the present invention will be described with reference to the accompanying drawings FIG. 1 is an exemplary drawing schematically showing the control system of the present invention. In this drawing, front wheels 2 and rear wheels 3 are mounted on the right and left front sides of a vehicle body 1 and on the right and left rear sides respectively (FIG. 1 shows wheels on one side only) through a suspension cylinder 4, such that when the steering wheel 5 is manipulated as shown in FIG. 1, the front wheels 2 are steered. The control system is provided with a pressure sensor 6 which detects the pressure in each suspension cylinder 4, a steering angle sensor 7, a brake sensor 8, and a vehicle speed sensor 9. From these sensors are outputted detection signals to a controller 10. Furthermore, there is provided an air solenoid valve device 11 for changing the damping force of the suspension cylinder 4 by means of a damping force changeover signal from the controller 10.

That is, as shown in FIGS. 2A and 2B, each suspension cylinder 4 is of such a construction that a piston 42 is inserted in a cylinder tube 41 to form an expansion chamber 43 and a contraction chamber 44, which are connected through a throttle 45, and the damping force of the suspension cylinder 4 is changed by changing the area of the opening of the throttle.

Therefore, the damping force of the suspension cylinders 4 is changed by feeding the air from an air tank 13 to the actuator 12 through the air solenoid valve device 11.

Furthermore, when the steering angular velocity from the steering angle sensor 7 has exceeded its set value, the controller 10 outputs an exciting signal to the air solenoid valve device 11 to increase the damping force of the suspension cylinder 4. Also when an oil pressure difference between the right and left suspension cylinders 4 has been decreased below a fixed value by the oil pressure from the pressure sensor 6, the controller 10 outputs a demagnetizing signal of the air solenoid valve device 11 in order to reduce the damping force of the suspension cylinder 4.

In the suspension cylinder control system, the above-mentioned construction, when the steering wheel 5 is turned, the damping force of the suspension cylinder 4 increases, thereby preventing a body roll with good response on cornering. Also when an oil pressure difference between the right and left suspension cylinders 4 exceeds a fixed value, a great damping force is maintained, thus locking the steering wheel in a manipulating position to prevent the body roll when the vehicle is rounding a curve.

In the embodiment shown in FIG. 1, a vehicle speed signal is fed by the vehicle speed sensor 9 to the controller 10 and a brake signal by the brake sensor 8 also to the controller 10, such that the aforementioned exciting signal is not outputted to the air solenoid valve device during a low-speed travel but is outputted only during a high-speed travel, and that during brake application, the exciting signal is fed to the air solenoid valve device 11 in order to prevent the nose dive, or the downward plunging of the front end of the vehicle body.

Furthermore, in the case of a construction vehicle such as a dump truck, the front end of the vehicle body tends to float up when the dumping body (not illustrated) is raised, and therefore to prevent this nose up, a dump lever position sensor 14 is provided so that when the body is raised for unloading, a dump lever position signal is outputted from the sensor 14 to the controller 10, which in turn supplies a damping force changeover signal to the air solenoid valve device 11. The air solenoid valve device 11 operates to increase the damping force of the suspension cylinders 4, thereby preventing the nose up of the vehicle body 1.

What is claimed is:

1. A suspension cylinder control system for motor vehicles comprising suspension cylinders mounted between a vehicle body and right and left front wheels and between the vehicle body and right and left rear wheels; a pressure sensor which detects an inside oil pressure of each of said suspension cylinders; a steering angle sensor which detects the steering angle of a vehicle steering wheel; and a controller which receives detection signals from said sensors, and outputs a signal to increase the damping force of said suspension cylinders in accordance with the steering angular velocity from said steering angle sensor until an oil pressure difference of said right and left suspension cylinders of the front and left wheels decreases below a fixed value.

2. A suspension cylinder control system as claimed in claim 1, further comprising an air solenoid valve means which, receiving a damping force changeover signal from said controller, drives a damping force changeover means provided on said suspension cylinders.

3. A suspension cylinder control system as claimed in claim 1 which further comprises a vehicle speed sensor which detects a vehicle speed; a brake sensor which detects brake application to the vehicle; and a dump lever position sensor which detects the raised condition of the dumping body; and in which signals from these sensors are inputted to the controller said controller further controlling the damping force of said cylinders as a function of said speed, brake, and dump lever position sensor signals.

4. A suspension cylinder control system as claimed in claim 3 further comprising an air solenoid valve means which drives said damping force changeover means provided on said suspension cylinders by the use of the damping force changeover signal outputted from said controller.

* * * * *